US005204534A

United States Patent [19]

Dubuit

[11] Patent Number: 5,204,534

[45] Date of Patent: Apr. 20, 1993

[54] ULTRAVIOLET RADIATION DRYING OVEN AND DRYING ENCLOSURE THEREOF

[76] Inventor: Jean-Louis Dubuit, 63 Rue du Chemin Vert, 75011 Paris, France

[21] Appl. No.: 788,939

[22] Filed: Nov. 7, 1991

[30] Foreign Application Priority Data

Nov. 7, 1990 [FR] France ................ 90 13810
Nov. 16, 1990 [FR] France ................ 90 14281

[51] Int. Cl.[5] ................ G02B 5/10; F21V 7/04

[52] U.S. Cl. ................ 250/492.1; 250/504 R; 250/453.11; 250/455.11; 359/867; 359/869

[58] Field of Search ........... 250/492.1, 504 R, 455.11, 250/454.11, 453.11; 359/867, 868, 869

[56] References Cited

U.S. PATENT DOCUMENTS

| | | | |
|---|---|---|---|
| 3,600,553 | 8/1971 | Costello | 219/348 |
| 4,208,587 | 6/1980 | Eastlund et al. | 250/492.1 |
| 4,573,277 | 3/1986 | Sudduth | 34/4 |
| 4,839,522 | 6/1989 | Bourgeois et al. | 250/455 |
| 4,990,788 | 2/1991 | Rabe et al. | 250/504 R |

FOREIGN PATENT DOCUMENTS

| | | |
|---|---|---|
| 18386 | 2/1972 | Australia . |
| 228517 | 7/1987 | European Pat. Off. . |
| 938499 | 3/1952 | Fed. Rep. of Germany . |
| 2506494 | 8/1976 | Fed. Rep. of Germany . |
| 2520267 | 7/1982 | France . |
| 2628192 | 9/1989 | France . |

*Primary Examiner*—Jack I. Berman
*Assistant Examiner*—Kiet T. Nguyen
*Attorney, Agent, or Firm*—Young & Thompson

[57] ABSTRACT

An ultraviolet radiation drying oven comprises in succession along a conveyor adapted to carry the objects to be dried a loading station to which the objects must be introduced, a drying enclosure containing at least one ultraviolet radiation lamp and an offloading station from which the dried objects are evacuated. At the loading station, a masking arrangement prevents escape of ultraviolet radiation. The masking arrangement comprises a turnstile mounted to rotate above the conveyor about an axis perpendicular to the conveyor and comprising a plurality of radial panels delimiting between them airlock compartments in a similar manner to a revolving door.

8 Claims, 4 Drawing Sheets

ULTRAVIOLET RADIATION DRYING OVEN AND DRYING ENCLOSURE THEREOF

BACKGROUND OF THE INVENTION

1. Field of the Invention

The present invention is generally concerned with ultraviolet radiation drying ovens of the kind comprising, successively staggered along a conveyor adapted to carry objects to be dried, a loading station to which said objects must be introduced, a drying enclosure containing at least one ultraviolet radiation lamp and an offloading station from which the dried objects are evacuated.

Drying ovens of this kind are used, for example, at the outlet end of a printing machine when the objects concerned are printed with a ploymerizable ink.

2. Description of the Prior Art

One problem to be overcome in producing drying ovens of this type concerns the necessity to prevent ultraviolet radiation escaping from the oven, in order to protect the operator.

At the offloading station, where it may be sufficient for the dried objects to be tipped loose in bulk by gravity, a cover over the respective end of the conveyor leaving between the conveyor and its own end wall a gap sufficient for the objects to fall through is simple and satisfactory.

The same cannot be said of the loading station end where it is further necessary to provide for adequate separation of the objects from each other so that they do not soil each other.

In one prior art drying oven of this kind the ultraviolet radiation is blocked at this location by disposing between the loading station and the drying enclosure a relatively long and angular tunnel along which the objects to be dried are fed by the conveyor in contact with a guide.

This arrangement has numerous disadvantages.

First of all, given the length required of the tunnel, it produces a relatively large and relatively costly assembly.

Also, given the inevitable uncertainty as to the effects of friction arising within the tunnel between the objects to be dried and the guide with which they are in contact as they move along, the objects may be soiled if they unintentionally catch up with each other.

An object of the present invention, in a first aspect, is an arrangement providing a very simple way to meet the two-fold requirement of blocking ultraviolet radiation and separating the objects to be dried.

SUMMARY OF THE INVENTION

In this first aspect, the present invention consists in an ultraviolet radiation drying oven comprising in succession along a conveyor adapted to carry the objects to be dried a loading station to which said objects must be introduced, a drying enclosure containing at least one ultraviolet radiation lamp and an offloading station from which the dried objects are evacuated with, at the loading station, masking means adapted to prevent escape of ultraviolet radiation, in which oven said masking means comprise a turnstile mounted to rotate above the conveyor about an axis perpendicular to the conveyor and comprising a plurality of radial panels delimiting between them airlock compartments.

The turnstile has the two-fold advantage of occupying relatively little space and of combining the required blocking with the required separation.

It has the additional advantage of being relatively economical to implement.

Preferably, in accordance with a second aspect of the invention, the drying enclosure employed is defined by faceted walls, that is to say by walls which, rather than being smooth, although they are adequately polished, feature a multiplicity of bosses, being manufactured in practise from hammered plate (by which is meant plate formed with a regular pattern of indentations on one side forming raised areas on the opposite side).

An advantageous result of this is that the ultraviolet radiation emitted by the associated lamp is diffused throughout the drying enclosure.

The objects to be dried can then simply be placed on the conveyor carrying them, without it being necessary to rotate them upon themselves to achieve a uniform effect of the ultraviolet radiation impinging on them.

In practise, in addition to two transverse end walls perpendicular to the conveyor each formed with a cutout forming a passage near the conveyor, the drying enclosure comprises a longitudinal cylindrical wall with generatrices parallel to the conveyor interrupted near the conveyor to allow the objects to be dried to pass.

In a third aspect of the invention, developed from these two arrangements (faceted walls and cylindrical wall), the ultraviolet radiation lamp contained in the drying enclosure is in the form of a tube disposed in a plane parallel to the conveyor and extending slantwise relative to the axis thereof.

It is already known to dispose a tube of this kind slantwise in a drying enclosure.

However, according to the invention further benefit is drawn from this arrangement given the circular contour of the transverse cross-section of the cylindrical wall of the drying enclosure.

From one end to the other to the tube, and because of the different distances between the tube and the cylindrical wall, the ultraviolet radiation emitted advantageously impinges, following reflection from the cylindrical wall, on different parts of the object to be dried staggered heightwise of the latter, improving the efficiency of drying.

For reasons of simplicity the profile of the transverse cross-section of the drying enclosure is at present usually circular.

However, if the objects to be dried have a significant height, as is the case with bottles, it is frequently found that their base receives less radiation energy than their top and the consequence of this is that drying at the base occurs under worse conditions than at the top; other things being equal, this requires the time of travel through the drying enclosure to be increased, compromising productivity.

A further object of the present invention, in a fourth aspect, is an arrangement whereby the conditions of drying can be rendered uniform and other advantages can be obtained.

To be more precise, in this fourth aspect, the invention consists in an ultraviolet radiation drying enclosure comprising a generally cylindrical wall containing said ultraviolet radiation lamp in a radiation plane parallel to the generatrices of said cylindrical wall and perpendicular to the longitudinal plane of symmetry wherein the profile of the transverse cross-section of said cylindrical wall is at least in part formed by elliptical arcs which have a common first focus on the axis along which said radiation plane intersects said longitudinal plane of symmetry and respective second foci staggered heightwise perpendicularly to said radiation plane.

The ultraviolet radiation is therefore focussed in a succession of areas staggered heightwise of the objects to be dried referred to hereinafter for convenience only as focussing areas.

The number of elliptical arcs used for the profile of the transverse cross-section of the cylindrical wall forming the reflector may be chosen to suit individual requirements. Of course, the profile can be smoothed between adjoining elliptical arcs, if required.

However, in all cases, according to a further feature of the invention the solid angles subtended by these elliptical arcs relative to the first focus common to them are preferably proportional to the square of their respective major axes.

As is known, the major axes are equal to the constant sum of the distances separating from their respective focus each point of the elliptical arcs concerned and therefore to the distance travelled by the radiation for the various focussing areas concerned.

As the radiation energy received in these focussing areas is inversely proportional to the square of this distance, whereas that emitted is proportional to the corresponding solid angle, the objects to be dried advantageously receive the same radiation energy over their full height.

This produces the required result of uniform drying conditions over their full height.

At the same time, the distance travelled by the radiation being reduced as compared with that when the profile of the transverse cross-section of the cylindrical wall forming the reflector is circular, the overall power rating of the drying enclosure in accordance with the invention is advantageously greater than that of an equivalent drying enclosure comprising a cylindrical wall whose profile in transverse cross-section is circular.

Also, its footprint is advantageously reduced.

The features and advantages of the invention will emerge from the following description given by way of example with reference to the appended diagrammatic drawings.

DESCRIPTION OF THE INVENTION

The figures show by way of example the application of the invention to the drying of bottles 10 previously printed with a ploymerizable ink.

Figure 1:
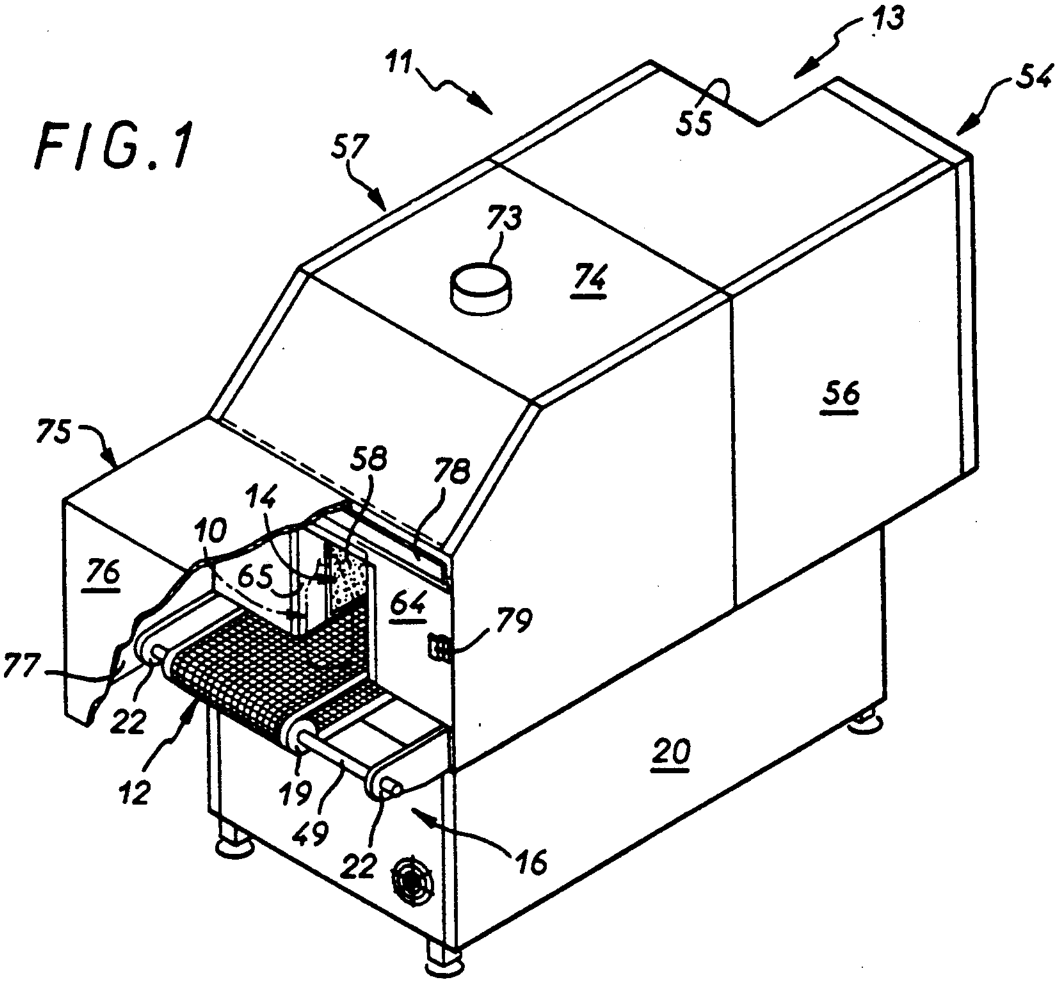
FIG. 1 is a locally cut away perspective view of an ultraviolet radiation drying oven in accordance with the invention seen from the front, that is to say from the offloading station side.
Figure 2:
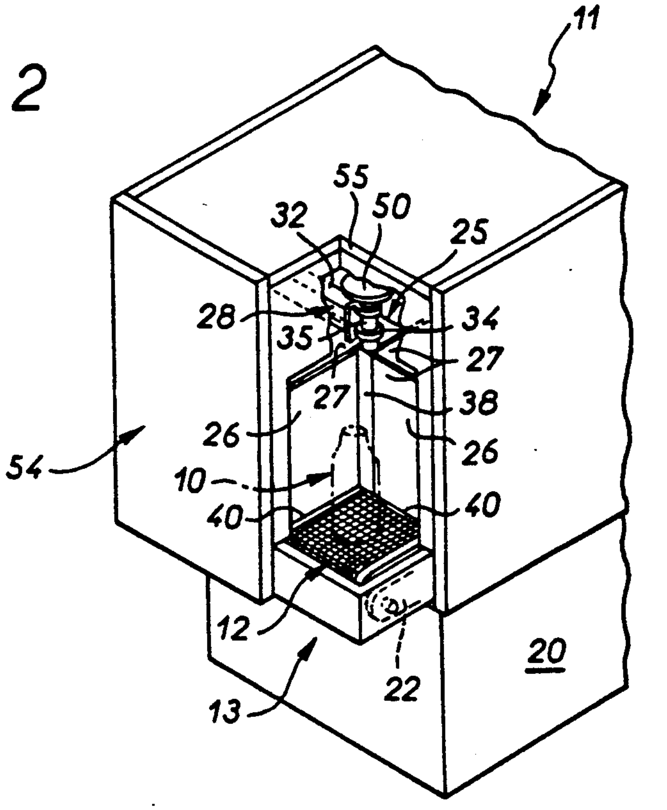
FIG. 2 is a locally cut away partial view of it in perspective seen from the rear, that is to say from the loading station side.
Figure 3:
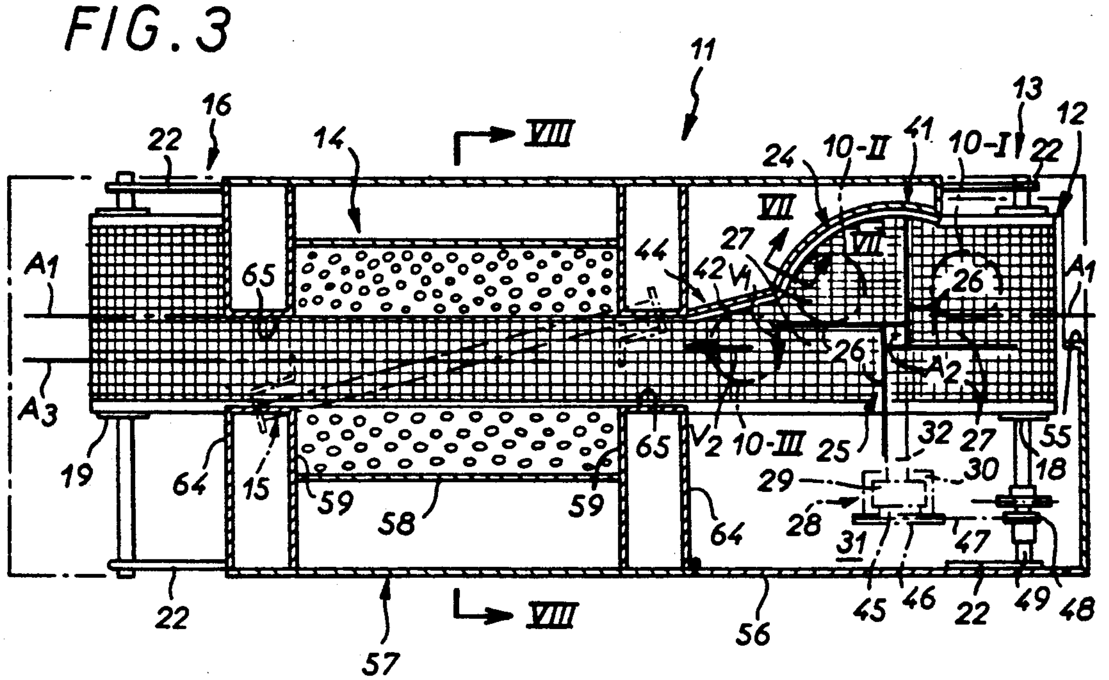
FIG. 3 is a schematic plan view of it in cross-section.
Figure 4:
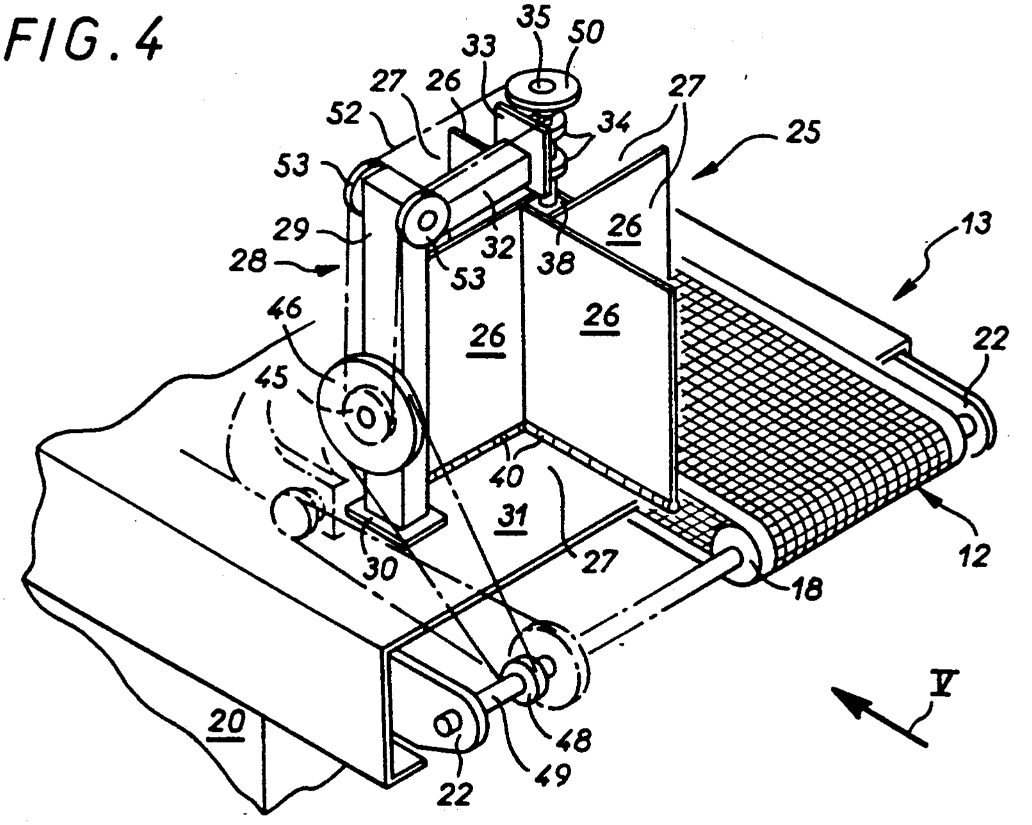
FIG. 4 is a partial view in perspective of the turnstile that it comprises.
Figure 5:
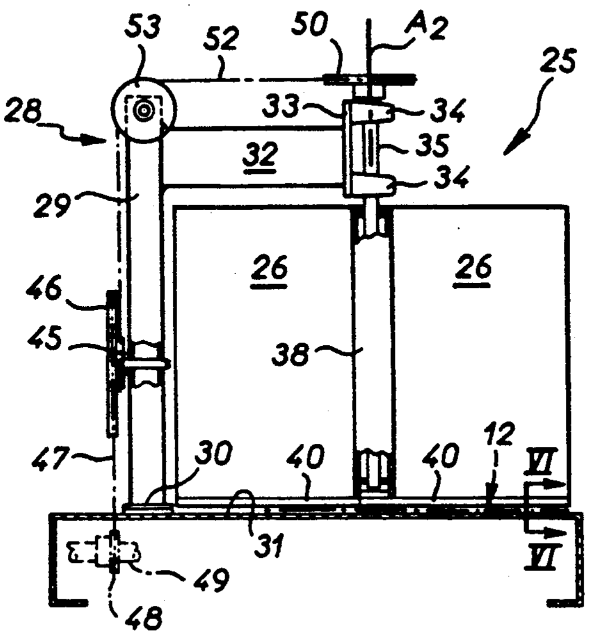
FIG. 5 is a locally cut away view in elevation of the turnstile to a larger scale and as seen in the direction of the arrow V in FIG. 4.
Figure 6:
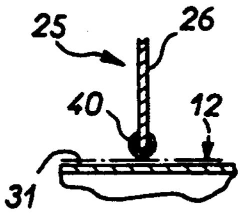
FIG. 6 is a view in transverse cross-section on the line VI—VI in FIG. 5 of one of the panels of the turnstile to a still larger scale.
Figure 7:
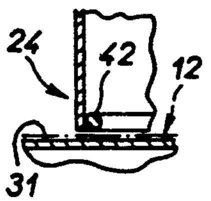
FIG. 7 is a partial view in transverse cross-section of the line VII—VII in FIG. 3 of the fixed cylindrical wall associated with the turnstile.

In a way that is known in itself and is schematically represented in FIG. 3 the oven 11 used for drying the bottles comprises successively staggered along a conveyor 12 adapted to carry the bottles 10 to be dried a loading station 13 to which the bottles 10 must be introduced one by one, a drying enclosure 14 containing at least one ultraviolet radiation lamp 15 and an offloading station 10 from which the dried bottles 10 are evacuated.

The conveyor is a conveyor belt running in an endless loop around two direction-changing members 18, 19 at least one of which, in practise the direction-changing member 18 at the front end, that is to say at the loading station 13 end, drives the conveyor belt.

The conveyor 12 runs horizontally along the top of a base unit 20 which carries all parts of the machine and whose interior volume is used to house various control, monitoring and security devices.

As these do not form any part of the present invention they will not be described here.

The axis A1 of the conveyor 12 is shown in chain-dotted line in FIG. 3. This axis is perpendicular to the rotation axis of the direction-changing members 18, 19 and extends along the median line of the belt runs.

The conveyor 12 extends between two longitudinal members 22 carried by the base unit 20.

The median part of the conveyor 12 is of mesh-like construction.

In a way that is known in itself there are provided at the loading station 13 masking means 24 adapted to prevent ultraviolet radiation escaping from the drying enclosure 14.

The masking means 24 comprise a turnstile 25 rotating above the conveyor 12 about an axis A2 perpendicular to the conveyor 12. Like a revolving door, it comprises a plurality of radial panels 26 delimiting between them airlock compartments 27.

The axis A2 of the turnstile 25 is offset transversely relative to the axis A1 of the conveyor 12 to the side opposite that from which the bottles 10 to be dried are loaded.

The turnstile 25 is suspended from a gibbet 28 extending over the conveyor 12.

The gibbet 28 comprises a vertical upright 29 attached by a baseplate 30 to a plate 31 fastened to the longitudinal members 22 at the side of the conveyor 12 and a crossmember 32 attached to and projecting cantilever-fashion from the upright 29 at a distance from its top.

Two flanges 34 are attached to the free end of the crossmember 32 by means of a transverse flange 33. A shaft 35 carrying the turnstile 25 is rotatably mounted in and axially keyed to two flanges 34 attached to the free end of the crossmember 32.

The turnstile 25 comprises four panels 26 at right angles.

All project cantilever fashion from a central box-section 38 with a square transverse cross-section coaxial with and fastened to the shaft 35, each having one edge laid against and fastened to a respective side panel of the central box-member 38.

For reasons that will emerge later, each panel 26 has a bead 40 at its base level with the conveyor 12.

The bead 40 extends around the bottom edge of the panel 26 and up each side thereof.

It may be, for example, a strip curved to shape and attached by its lips to the respective panel 26, by spot-welding, for example.

On the side opposite the upright 29 of the gibbet 28 the turnstile 25 is bordered at the perimeter of part at least of its path of movement by a fixed cylindrical wall 41 which is also suspended to allow the conveyor 12 to pass under its lower edge.

The fixed cylindrical wall 41 extends substantially 90° around the axis A2 of the turnstile 25, with which it is coaxial. It has a bead 42 at its base.

The bead is in the form of a ring appropriately attached, for example by spot welding, to points along the lower edge of the fixed cylindrical wall 41.

The downstream end of the fixed cylindrical wall 41 is extended by a fixed vertical wall 44. This wall extends obliquely to the axis A1 of the conveyor 12.

Like the fixed cylindrical wall 41, the fixed oblique wall 44 is suspended and has a bead 42 at its base continuous with that on the fixed cylindrical wall 41.

The turnstile 25 is preferably controlled synchronously with the conveyor 12.

To this end there is provided on the upright 29 of the gibbet 28 a rotatable drive pulley 45 paired with a pulley 46 around which passes in an endless loop a transmission cable 47 which also passes round a pulley 48 constrained to rotate with the shaft 49 of the drive direction-changing member 18 of the conveyor 12. Between the drive pulley 45 and a pulley 50 at the top end of and constrained to rotate with the shaft 35 on the axis A2 of the turnstile 25 there is disposed an endless loop transmission cable 52 the two runs of which travel 90° around respective parallel direction-changing pulleys 53 rotatably mounted in the corner area of the gibbet 28 at the top of the upright 29.

The transmission ratios are such that the linear speed of advance V2 of the conveyor 12 along its axis A1 is greater than the tangential linear speed V1 of the free edge of the panels 26 of the turnstile 25.

For example: $V2 = 1.5\ V1$.

At the loading station 13 there is provided a cover 54 which has on a vertical edge perpendicular to the conveyor 12 a cut-out 55 exposing a part of the corresponding end of the conveyor 12, on the same side as the fixed cylindrical wall 41, with a door 56 on the opposite side.

The fixed cylindrical wall 41 and the fixed oblique wall 44 are suspended from the cover 54.

The loading station 13 is followed by a chamber 57 containing the drying enclosure 14.

The drying enclosure is preferably defined by faceted walls.

In practise these are polished hammered plate walls.

The drying enclosure 14 comprises a longitudinal cylindrical wall 58 whose generatrices are parallel to the axis A1 of the conveyor 12 and which is interrupted in the vicinity of the conveyor 12 along two generatrices; it further comprises two transverse end walls 59 perpendicular to the conveyor 12 each having a cut-out passage 60 in the vicinity of the conveyor.

In the embodiment shown in FIGS. 1 through 9, the cylindrical wall 58 is circular in transverse cross-section and its axis A3 is offset transversely relative to the axis A1 of the conveyor 12, on the same side as the axis A2 of the turnstile 25 but further than the latter.

Where its transverse end walls 59 join to its cylindrical wall 58, the drying enclosure 14 further comprises facets 62 which define slantwise edges between the conveyor 12 and its diametral area.

To allow the conveyor 12 to move the drying enclosure 14 is suspended from the walls of the chamber 57.

For reasons to be explained later, the transverse end walls 59 of the drying enclosure 14 are spaced from the respective transverse end walls 64 of the chamber 57 and a tunnel 65 with the same profile as the cut-out forming a corresponding passage 60 extends from each of these transverse end walls 59 to the respective transverse end wall 64 of the chamber 57.

This profile is rectangular in this embodiment and this applies to both of the transverse end walls 59 of the drying enclosure 14.

The ultraviolet radiation lamp 15 in the drying enclosure 14 is preferably in the form of a tube, as here, disposed in a plane parallel to the conveyor 12 and extending slantwise relative to the axis A1 of the conveyor and therefore slantwise relative to the axis A3 of the cylindrical wall 58 of the drying enclosure 14.

Half of the ultraviolet radiation lamp 15 is disposed on each side of the axis A3 of the cylindrical wall 58. The lamp extends between the two transverse end walls 59 and projects out of the drying enclosure 14 through passages 66 provided for this purpose in the transverse end walls 59. These carry on their outside surface, projecting into the free space between them and the transverse end walls 64 of the chamber 57, lugs 68 for supporting sockets in which the tube is mounted.

The distance between the transverse end walls 59 of the drying enclosure 14 and the transverse end walls 64 of the chamber 57 is sufficient to allow mounting and dismounting of ultraviolet radiation lamp 15.

The ultraviolet radiation lamp 15 is disengaged from the sockets carried by the lugs 68 and then moved lengthwise in one direction until, after escaping from the passage 66 in the transverse end wall 59 concerned, its opposite end (in this direction of movement) can be inserted in the tunnel 65, in practise the tunnel 65 nearer the downstream end of the conveyor 12, so that it can be withdrawn from the drying enclosure 14 through the tunnel 65.

The chamber 57 also contains a ventilator fan 70 above the drying enclosure 14 and at least one of its walls is perforated for ventilating the interior volume of the drying enclosure 14.

In this embodiment only the cylindrical wall 58 is perforated and the perforations 71 are aligned along its top generatrix.

Oblique deflectors 72 in the chamber 57 on each side of the drying enclosure 14 delimit the field of action of the ventilation fan 70 to improve its efficiency.

The top wall of the chamber 57, which has an oblique section at the front, forms a cover 74 providing access to the interior of the chamber 57 and therefore to the ventilation fan 70 and the sockets carried by the lugs 68.

The top part of the cover 74 is fitted with a coupling 73 for connecting the chamber 57 to an exhaust duct.

A cover 75 at the offloading station 16 covers completely the corresponding end of the conveyor 12, leaving between the conveyor and its front end wall 76 a passage 77 through which the dried bottles 10 can fall.

The cover 75 is in the form of a generally parallelpiped-shaped box with no bottom and no rear end wall. A right-angle lip on its top wall is hooked over a bar 78 provided for this purpose on the transverse end wall 64 of the chamber 57. Lips on its lateral walls are slidingly engaged in slideways 79 provided for this purpose on the transverse end wall 64.

It therefore projects from the end wall 64 cantilever-fashion.

In operation the bottles 10 to be dried are placed in turn on the conveyor 12 at the loading station 13, on the part of the end of the conveyor exposed by the cut-out 55 in the cover 54, as schematically represented in chain-dotted outline at 10-I in FIG. 3.

The bottles 10 to be dried are disposed in turn in one compartment 27 of the turnstile 25, between two of its panels 26.

A bottle 10 to be dried when placed on the conveyor 12 in this way is immediately entrained by the conveyor until it comes into contact with the fixed cylindrical wall 41 as schematically represented in chain-dotted outline at 10-II in FIG. 3.

As explained above, the linear speed of advance V2 of the conveyor 12 is greater than the linear speed of advance V1 of the free edge of the panels 26 of the turnstile 25. The bottles 10 to be dried entrained by the conveyor 12 may therefore catch up with the panel 26 on its downstream side, in which case they are held back by it, so to speak.

However, if this happens the bottles bear only on the bead 40 at the base of the panel 26.

As the bead 40 is therefore in contact only with the bottom of the bottle 10 to be dried, where there is normally no printing, the bottle 10 cannot be soiled.

The same applies if, entrained by the conveyor 12, the bottles 10 to be dried come into contact with the fixed cylindrical wall 41.

In this case, they come into contact only with the bead 42 of this wall.

If, when slowed down by the fixed cylindrical wall 41, a bottle 10 be dried was caught up with by the panel 26 of the turnstile 25 on its upstream side, there will also be no risk of soiling because the bead 40 on each of the panels 26 projects to each side thereof.

When, guided by the fixed cylindrical wall 41, a bottle 10 to be dried arrives at the end of the panel 26 of the turnstile 26 which is holding it back, in line with the fixed oblique wall 44, it is in contact only with the conveyor 12.

Guided by the fixed oblique wall 44, the bottle 10 to be dried then enters the tunnel 65, as shown schematically in chain-dotted outline at 10-III in FIG. 3, until it reaches the drying chamber 41 through which it passes longitudinally.

Along its part of movement through the drying enclosure 14 the bottle 10 to be dried receives over all its surface the ultraviolet radiation emitted by the ultraviolet radiation lamp 15 and diffused throughout the drying enclosure 14 by reflection from its walls.

Figure 8:
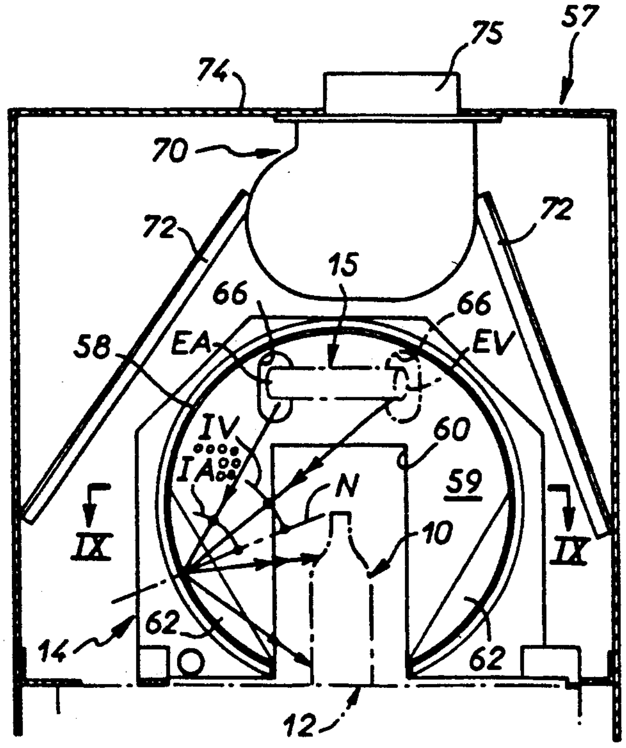
FIG. 8 is an elevation view in cross-section on the line VIII—VIII in FIG. 3 of the ultraviolet radiation drying oven in accordance with the invention shown to the same scale as in FIG. 5.
Figure 9:
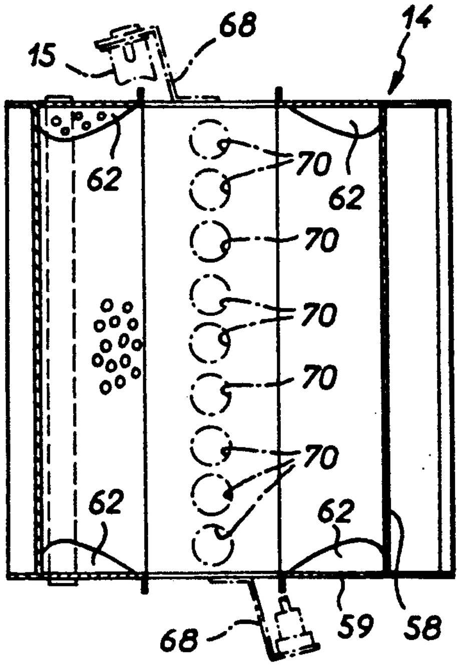
FIG. 9 is a plan view in cross-section on the line IX—IX in FIG. 8 of its drying enclosure.
Figure 10:
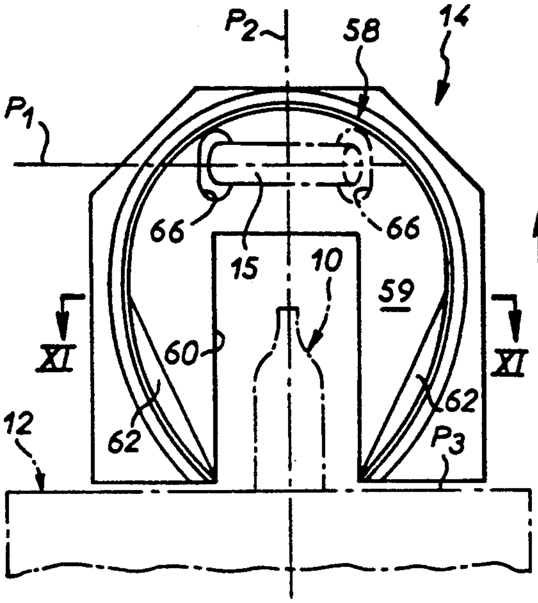
FIG. 10 is an elevation view in cross-section on the line X—X in FIG. 11 of an ultraviolet radiation drying enclosure in accordance with the invention similar to FIG. 8.
Figure 11:
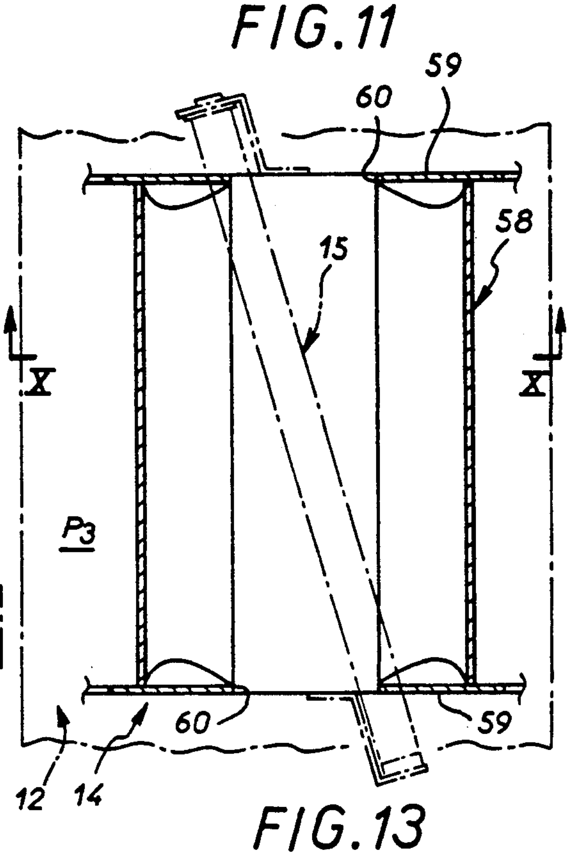
FIG. 11 is a plan view of it in cross-section on the line XI—XI in FIG. 2 in FIG. 10.

Because the lamp 15 is obliquely disposed in the drying enclosure 14 the angles of incidence IA, IV of the radiation on the cylindrical wall 58 of the drying enclosure 14 relative to a normal N to the cylindrical wall 58 are different according to whether the radiation is emitted by the upstream end EA of the ultraviolet radiation lamp 15 or by its downstream end EV, as schematically represented by the arrows in FIG. 8.

The advantageous result of this is to spread the effects of the ultraviolet radiation heightwise of the bottle 10 to be dried.

The oblique disposition of the lamp 15 has the further advantage of favoring drying first of the front surface of the bottle 10 (meaning the front surface relative to its direction of movement) and then of its rear surface.

Leaving the drying enclosure 14 through the tunnel 65, the dried bottle 10, still entrained by the conveyor 12, falls off the conveyor 12 at its downstream end.

It can then be collected in a hopper or taken up by another conveyor (not shown).

Forming an airlock, the turnstile 25 both masks the ultraviolet radiation at the loading station 13 and separates the bottles 10 to be dried, normally preventing any buildup of the latter at the entrance to the drying enclosure 14.

Should any such buildup occur, the door 56 in the cover 54 enables it to be cleared.

FIGS. 10 through 13 relate to a preferred embodiment of the drying enclosure 14, to be more precise of its cylindrical wall 58, this enclosure containing the ultraviolet radiation lamp 15 as previously.

The ultraviolet radiation lamp 15 lies on a plane P1 referred to hereinafter for convenience only as the radiation plane.

The radiation plane P1 is parallel to the generatrices of the cylindrical wall 58 and perpendicular to its longitudinal plane of symmetry P2.

The objects 10 to be dried are placed upright on a plane P3 referred to hereinafter for convenience only as the movement plane.

The movement plane P3 is parallel to the radiation plane P1.

In practise it is the plane of the conveyor 12.

The positions of the planes P1, P2, P3 are schematically represented in the figures by chain-dotted lines.

Figure 12:
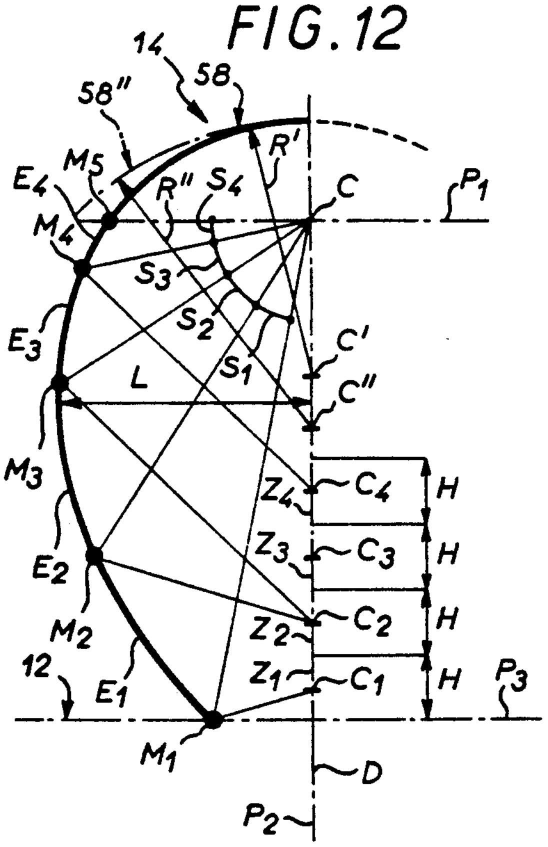
FIG. 12 is a diagram showing how the profile of the transverse cross-section of the cylindrical wall of this drying enclosure is determined.

Referring to FIG. 12, the profile of the transverse cross-section of the cylindrical wall 58 is at least in part formed of elliptical arcs E1, E2, E3, . . . , $E_i$ which have a common first focus C on the axis along which the radiation plane P1 intersects the longitudinal plane of symmetry P2 and respective second foci C1, C2, C3, . . . , $C_i$ staggered heightwise perpendicularly to the radiation plane P1.

To simplify FIG. 12 only four elliptical arcs E1, E2, E3 and E4 are shown, starting from a point M1 in the movement plane P3.

Also for reasons of simplicity, the elliptical arc E1 extends from this point M1 to a point M2, the elliptical arc E2 extends from the point M2 to a point M3, the elliptical arc E3 extends from the point M3 to the point M4 and the elliptical arc E4 extends from the point M4 to a point M5 in the radiation plan P1.

In practise, however, the elliptical arcs E1, E2, E3, E4 are not necessarily strictly consecutive to each other, some smoothing being applied in practise between the elliptical arcs to achieve the necessary continuity of the surface of the cylindrical wall 58.

In this embodiment the profile of the transverse cross-section of the cylindrical wall 58 beyond the point M5, that is to say above the radiation plane P1, is a circular arc of radius R' centred at C' between the radiation plane P1 and the movement plane P3.

Of course, the arrangements are symmetrical on either side of the longitudinal plane of symmetry P2.

In the embodiment shown in FIG. 12 all the second foci C1, C2, C3, C4 of the elliptical arcs E1, E2, E3, E4 are staggered along a same straight line segment D contained in the longitudinal plane of symmetry P2.

In FIG. 12 this straight line segment D is therefore coincident with the plane P2.

The second foci C1, C2, C3, C4 are in practise the mid-points of successive straight line segments Z1, Z2, Z3, Z4 staggered heightwise from the movement plane P3, all have the same length H and are in corresponding relationship to respective separate focussing areas for the objects 10 to be dried.

The elliptical arcs E1, E2, E3, E4 subtend solid angles S1, S2, S3, S4 at their common first focus C.

For reasons explained already, the solid angles S1, S2, S3, S4 are preferably proportional to the square of the major axes A1, A2, A3, A4 of the respective elliptical arcs E1, E2, E3, E4.

In other words:

$$\frac{S1}{(A1)^2} = \frac{S2}{(A2)^2} = \frac{S3}{(A3)^2} = \frac{S4}{(A4)^2} \quad \text{(I)}$$

In an ellipse, the sum of the distances from any point to both foci is equal to the major axis.

In other words:

for the elliptical arc E1: M1C1+M1C=A1
for the elliptical arc E2: M1C2+M2C=A2
for the elliptical arc E3: M1C3+M3C=A3
for the elliptical arc E4: M1C4+M4C=A4.

The distances M1C1+M1C, M2C2+M2C, M3C3+M3C and M4C4+M4C are the distances travelled by the ultraviolet radiation between the ultraviolet radiation lamp 15 concentric with the first focus C and the focussing areas Z1, Z2, Z3, Z4 each concentrated on the respective second foci C1, C2, C3, C4.

The above equation (I) therefore expresses the fact that the solid angles S1, S2, S3, S4 subtended by the elliptical arcs E1, E2, E3, E4 are proportional to the square of the respective distances travelled by the radiation.

The radiation energy emitted by the ultraviolet radiation lamp 15 is directly proportional to the respective solid angle S1, S2, S3, S4 whereas the radiation energy received by the objects 10 to be dried is inversely proportional to the square of the distance A1, A2, A3, A4 travelled by this radiation.

By using parameters satisfying the equation (I) the radiation energy received by each focussing area Z1, Z2, Z3, Z4 along the height of the objects 10 to be dried is substantially constant.

The cylindrical wall 58 is preferably a faceted wall as previously.

In practise it is made from polished hammered plate.

The same preferably applies to the transverse end walls 59.

As these arrangements are well known in themselves, they will not be described in more detail here.

Note that, as shown by a chain-dotted line in FIG. 12, the maximum half-width L of the cylindrical wall 58 is in all circumstances less than the radius R" of a cylindrical wall 58" having a circular cross-section centred at C" and a profile passing through the top area of the cylindrical wall 58 and the point M1.

This advantageously reduces the footprint of the drying enclosure 14 in accordance with the invention.

Figure 13:
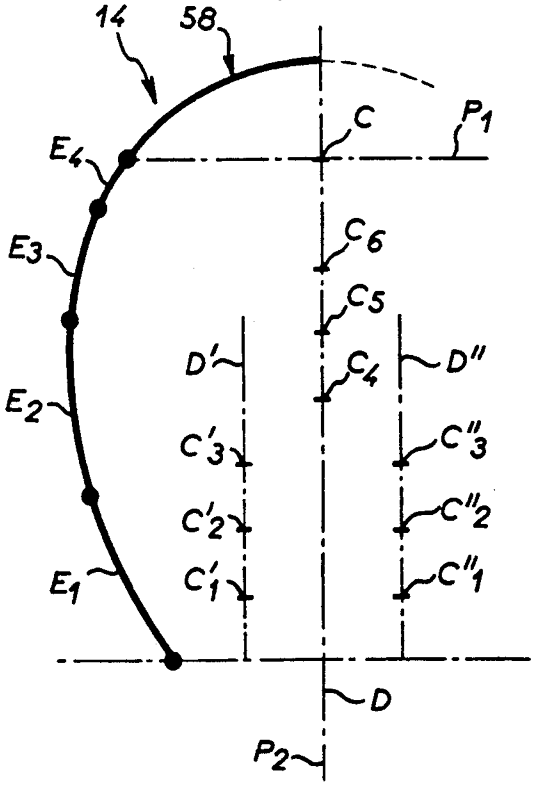
FIG. 13 is a diagram similar to FIG. 12 for a different embodiment.

In the embodiment shown in FIG. 13, and to allow for the width of the object 10 to be dried, for some at least of the elliptical arcs E1, E2, E3, . . . $E_i$ the second foci are duplicated with, for the lefthand part of the cross-section, second foci C'1, C'2, C'3, . . . $C'_i$ staggered along a straight line segment D' parallel to the longitudinal plane of symmetry P2 on its lefthand side and, for the righthand part of the cross-section, second foci C"1, C"2, C"3, . . . $C''_i$ staggered along a straight line segment D" to the right of the longitudinal plane of symmetry P2, symmetrically to the line D' relative to the plane P2.

In this embodiment this applies only to the first three second foci C'1-C"1, C'2-C"2 and C'3-C"3, while the second focus C4 is as previously on the straight line segment D.

Furthermore, in this embodiment three other second foci C5, C6 are provided on the straight line segment D.

Of course, the present invention is not limited to the embodiments described and shown but encompasses any variant execution thereof.

In particular, any number of second foci may be used in the drying enclosure.

Applications of the invention are not limited to drying bottles, but encompass the drying of any other objects including flat objects, for example.

These objects are then placed flat on the conveyor instead of upright thereon.

There is claimed:

1. Ultraviolet radiation drying enclosure comprising a generally cylindrical wall containing said ultraviolet radiation lamp in a radiation plane parallel to the generatrices of said cylindrical wall and perpendicular to the longitudinal plane of symmetry wherein the profile of the transverse cross-section of said cylindrical wall is at least in part formed by elliptical arcs which have a common first focus on the axis along which said radiation plane intersects said longitudinal plane of symmetry and respective second foci staggered heightwise perpendicularly to said radiation plane.

2. Drying enclosure according to claim 1 wherein said second foci of all said elliptical arcs are staggered along a common straight line segment contained in said longitudinal plane of symmetry.

3. Drying enclosure according to claim 1 wherein for at least some of said elliptical arcs said second foci are duplicated with for the lefthand part of the cross-section second foci staggered along a straight line segment parallel to said longitudinal plane of symmetry on the lefthand side thereof and for the righthand part of the cross-section second foci staggered along a straight line segment to the right of said longitudinal plane of symmetry and symmetrical to said first straight line segment relative to said longitudinal plane of symmetry.

4. Drying enclosure according to claim 1 wherein said second foci are the mid-points of successive same length straight line segments.

5. Drying enclosure according to claim 1 wherein the solid angles subtended by said elliptical arcs relative to said common first focus are proportional to the square of their major axes.

6. Drying enclosure according to claim 1 wherein said cylindrical wall is a faceted wall.

7. Drying enclosure according to claim 6 wherein said cylindrical wall is made from polished hammered plate.

8. Drying enclosure according to claim 1 wherein said ultraviolet radiation lamp is in the form of a tube extending slantwise relative to the generatrices of its cylindrical walls.

* * * * *